Patented Aug. 14, 1923.

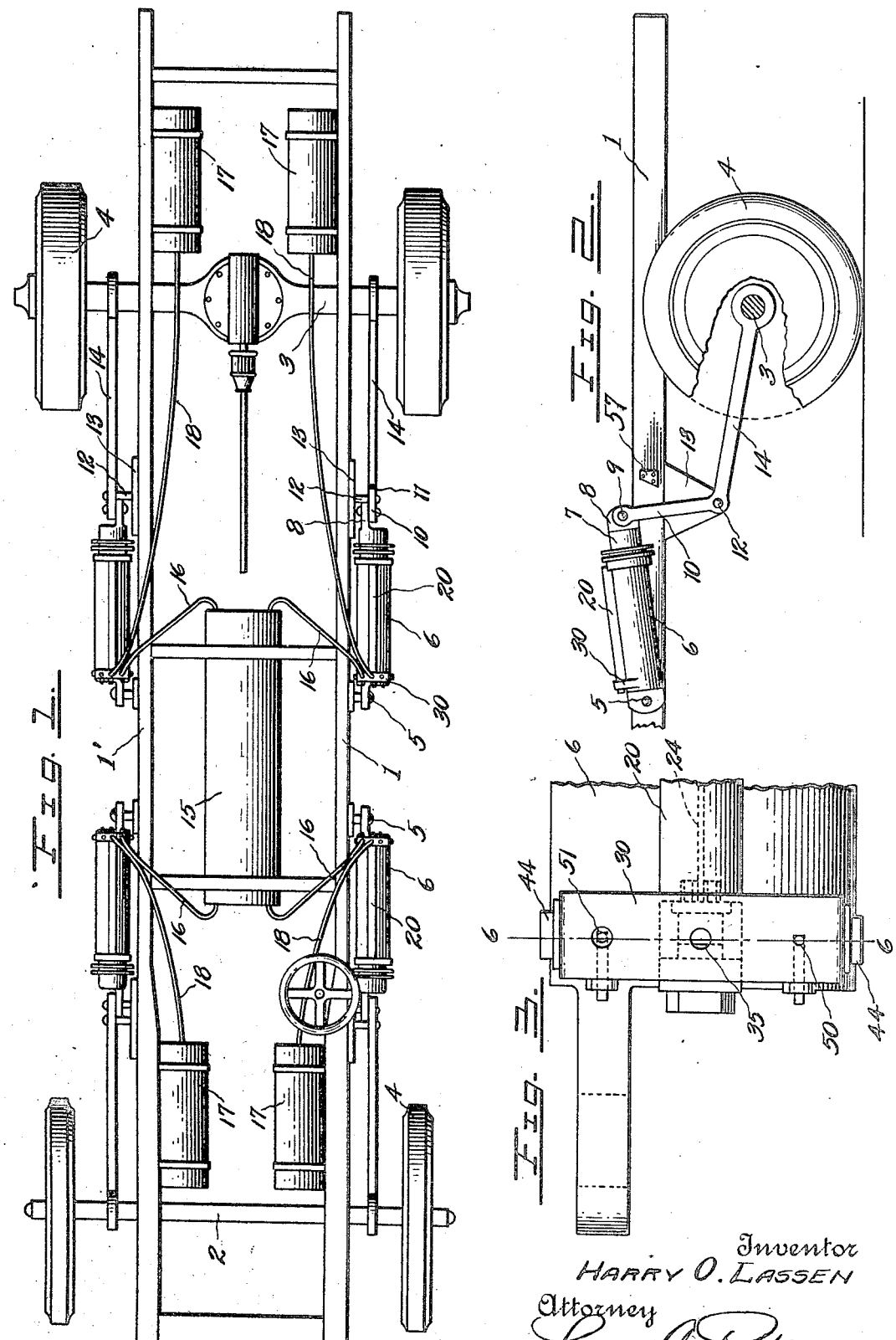

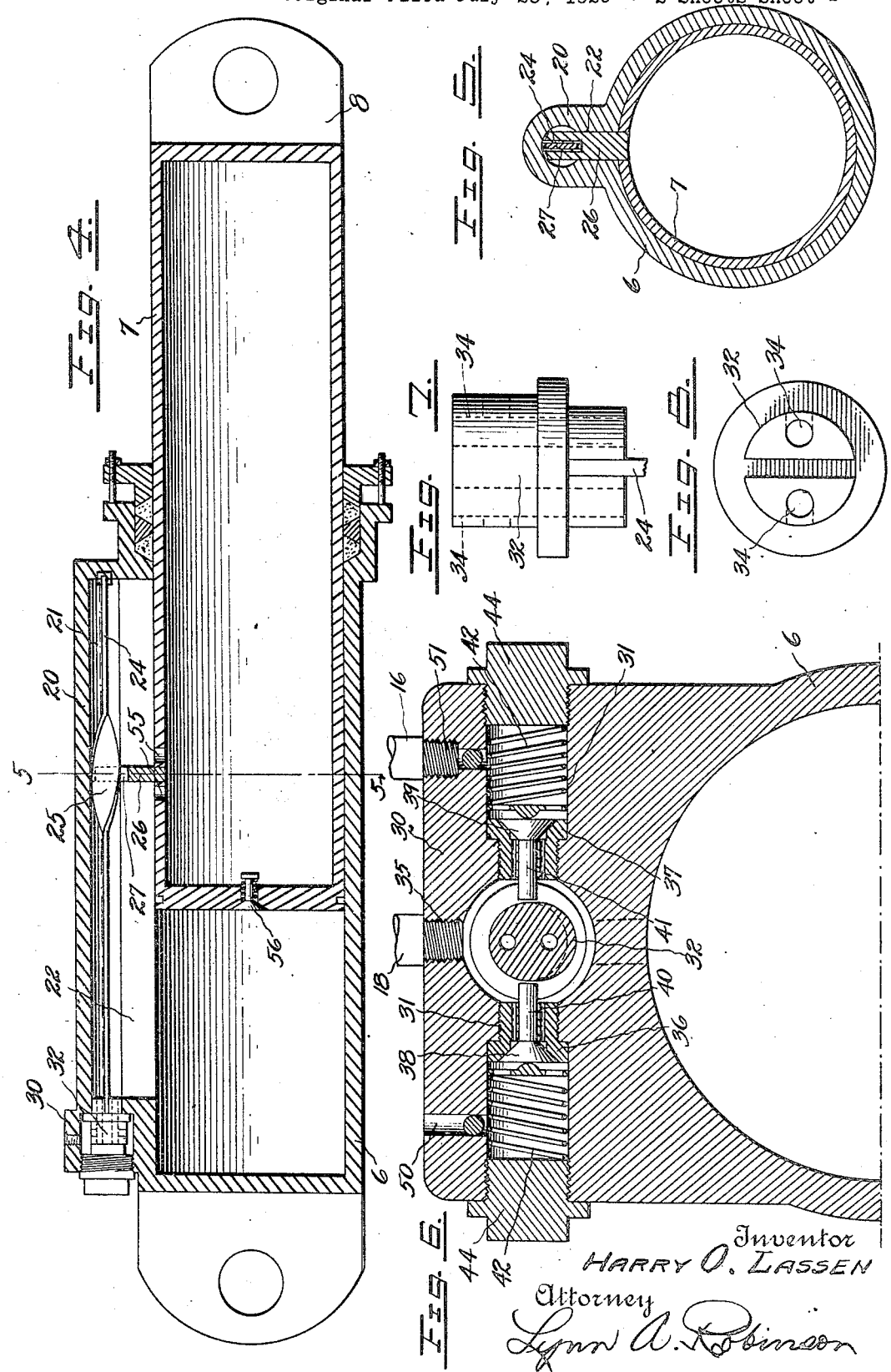

1,464,680

UNITED STATES PATENT OFFICE.

HARRY OTIS LASSEN, OF SEATTLE, WASHINGTON.

PNEUMATIC SUSPENSION FOR VEHICLE BODIES.

Application filed July 26, 1920, Serial No. 399,144. Renewed January 22, 1923.

*To all whom it may concern:*

Be it known that I, HARRY OTIS LASSEN, a citizen of the United States, and resident of the city of Seattle, county of King, State of Washington, have invented certain new and useful Improvements in Pneumatic Suspensions for Vehicle Bodies, of which the following is a specification.

This invention relates to a pneumatic suspension for automobiles, trucks or like vehicle bodies, and more particularly to pneumatic air cushions to be used in lieu of the usual springs for supporting the body of a vehicle upon the axles, and whereby shock, jolt and vibration incidental to travel over rough and uneven road surfaces will, to a great extent, be eliminated.

The principal object of the present invention is to provide a pneumatic suspension of the above character, whereby the maximum resiliency and riding qualities of a vehicle will be maintained, and the body of the vehicle kept level, or on an even keel and at substantially the same riding height regardless of the load that is carried therein.

Another object of the invention is to provide an air suspension, wherein a plurality of air cylinders are fixed to the vehicle body frame and have pistons operable therein whereby supporting connection is made with the vehicle axles, and wherein air clearance tanks of relatively large volume are directly connected with the several cylinders to make possible a wide variation in the volume of supporting air within the cylinders without any appreciable variation in the pressure.

A further object is to provide an air suspension wherein the several air cylinders have individual connection with a main supply tank wherein air is confined under high pressure, and wherein each cylinder is equipped with valve mechanism of a novel character that is automatically operable by movement of its piston to admit air from the storage tank into or from the cylinder accordingly as is necessary to keep the body at the same riding height.

In accomplishing these and other objects of the invention, I have provided the improved details of construction the preferred forms of which are illustrated in the accompanying drawings, wherein—

Figure 1 is a plan view of an automobile truck equipped with pneumatic suspension devices, constructed and mounted according to the present invention.

Figure 2 is a side view of one of the devices, illustrating a preferred manner in which it may be connected with a vehicle axle and truck body frame.

Figure 3 is an enlarged top view of the mounting end of one of the air cylinders.

Figure 4 is a longitudinal, sectional view of an air cylinder, its piston, and the valve mechanism therein that is actuated by movement of the piston to admit air into or from the cylinder.

Figure 5 is a transverse section taken on the line 5—5 in Figure 4.

Figure 6 is an enlarged sectional detail taken on the line 6—6 in Figure 3, particularly illustrating the valves and their actuating mechanism.

Figure 7 is a detail side view of a valve actuating cam.

Figure 8 is an inner end view of the same showing the disposition of the air channels at opposite sides of the actuating rod.

Referring more in detail to the several views of the drawings wherein like reference numerals designate the same or like parts—

1 and 1' designate the longitudinal side beams forming a part of a vehicle body frame, and 2 and 3 respectively designate the forward and rearward axles wherefrom the body is supported, and which are equipped with the usual ground wheels 4.

Pivotally mounted at opposite sides of the body frame and adjacent each of the wheels, by means of pins, bolts or the like 5 that are extended pivotally through the beams 1 and 1', are air cylinders 6, each of which has a tubular, elongated piston 7 mounted for reciprocation therein and which latter are equipped at their outer ends with apertured lugs 8 for receiving bolts 9 whereby connection is made with the upper ends of the vertically directed arms 10 of bell crank levers 11 that are pivotally fixed, by bolts 12, to the vehicle frame and which have substantially horizontally extended arms 14 connected pivotally, in any suitable manner to the corresponding vehicle axles.

The preferred disposition of the several air cylinders relative to the vehicle frame and axles, is illustrated in Figure 1, and the operation and supporting connection of the body from the axles is illustrated best in Figure 2. This particular manner of construction is however not the only way in which it could be done, and it will be apparent later that the cylinders could be mounted vertically and the pistons directly connected to the axles and still operate in the same manner as herein described. However, the manner of mounting here shown is preferable in most instances as it permits a greater vertical movement of the vehicle wheels relative to the frame or body, with a shorter stroke of the pistons than in other methods of mounting.

Carried in any convenient place on the vehicle, is an air storage tank 15 whereinto air is pumped and confined under high pressure and is distributed, as necessary, through flexible conduits 16 to the several cylinders 6 to serve as the medium against which the pistons act and whereon the body of the vehicle is resiliently supported. Air would preferably be supplied to the storage tank by means of a pump driven from the motive power of the vehicle, and means of a suitable character would be provided to maintain a constant and effective pressure within the tank. These parts are not illustrated in the drawing.

Also mounted at convenient places on the vehicle frame are four auxiliary air, or clearance tanks 17, each of which is individually and directly connected by a flexible conduit 18 with the pressure chamber of one of the air cylinders 6. These latter tanks serve as clearance tanks and have a relatively large volume as compared with the working volume of the cylinders, and, being in direct and open communication with the air cylinders, provide for a wide variation in the volume of supporting air within the cylinders without any apparent change of the pressure therein; that is, a piston could move from the outer to the inner end of a cylinder without causing any natural increase in resistance as it neared its inner limit. This would not be possible without the clearance tank, or its equivalent.

Since all of the air cylinders, pistons, and valve mechanism of the several units are identical in construction and in operation, in the following description only one unit will be described in detail with the understanding that the description relates equally to all units.

Along one side of the cylinder 6 is an integrally cast rib 20, provided with a longitudinal bore 21 that is parallel with the axes of the cylinder and which opens throughout its length, into the cylinder through a longitudinal slot 22. Mounted lengthwise within the bore 21 and revolubly supported at its opposite ends, is a flat bar 24 which at about its center has a half turn twist as shown at 25. An arm 26 is fixed in, and extends laterally from near the inner end of the piston 7, through the slot 22 and at its outer end has a slot 27, Figure 5, which slidably receives the bar 24 in such manner that movement of the piston that would advance the arm across the twist of the bar will cause the latter to be partially rotated.

The normal working position of the piston is that in which it is shown in Figure 4, and in this position the arm 26 engages the bar 24 centrally of its twisted portion 25. Movement then of the piston outwardly from this normal position will cause rotation of the bar in one direction while movement inwardly will cause it to be rotated in the opposite direction; this being for the purpose of actuating certain valve mechanism, the operation and construction of which will now be described.

Cast integrally with the cylinder wall, adjacent its mounting end at the inner end of the rib 20, is a transverse head 30 having a channel 31 therethrough which communicates centrally with the inner end of the bore 21. Revolubly contained in this latter channel 31 and extending into the bore 21, is a cam head 32 which is fixed to and is adapted to be revolved by the bar 24. This head has air channels 34 therein whereby a free passage of air is permitted between the channel 31, bore 21 and cylinder pressure chamber. The conduit 18 from the clearance tank 17 is threaded into a bore 35 which leads directly into the channel 31 adjacent the head 32 and thereby permits unrestricted communication, through the channels 34, between the interior of the cylinder chambers and clearance tank.

Threaded into the channel 31, at each side of the cam 32 are apertured valve seats 36 and 37, Figure 6, and these are equipped with outwardly opening valves 38 and 39 respectively having valve stems 40 and 41 which are adapted to be individually engaged by the cam, when it is rotated by movement of the piston 7, and to be moved thereby to open position.

The valves are normally, and are yieldingly held closed, by coiled springs 42 placed within the outer ends of the channel 31 to bear against the heads of the valves; the springs being held functionally within the channel, and the end of the latter closed by means of plugs 44 that are threaded thereinto. Leading from the channel 31, at the outside of the valve 38 is an air exhaust channel 50, and likewise opening into the channel at the outside of the valve 39 is a port 51 into which the conduit 16 from the air supply tank 15 is extended.

The cam 32 is of such character and so mounted on the bar 24 that, when the piston 7 is at a normal position, it does not affect either valve, but when the piston moves outwardly it causes the cam to be revolved in such direction that it will engage the stem of the valve 38, will move this valve to open position and will permit an exhaust of air from the cylinder and its clearance tank 17, through the port 50. Should the piston be moved inwardly from normal position, the cam will be rotated in an opposite direction, to actuate the valve 39 to open position and allow air to enter the cylinder from the supply tank 15.

The channel 50, and port 51 can be made small enough or fitted with adjustable throttle members so that the discharge or inlet of air therethrough will be sufficiently slow that the ordinary vibration of the pistons within the cylinders will have no material effect on the flow of air into or from the cylinders, and only a continued stay of the piston at either side of its normal position would cause an effective discharge or inflow of air.

In order that the air cylinders may have a large, effective working volume, I have increased their normal volume by the use of the hollow pistons 7. These have lateral openings 55 in registration with the slot 22 which permits air to enter their interior. The slots 22 are not extended to the inner ends of the cylinders, in order that closed air pockets may be provided at these ends to prevent shock on the parts should the pistons be moved to their inner limit of travel. The pistons also are provided with inwardly opening spring pressed valves 56 in their inner ends in order that air pressure may not hold the pistons against outward movement after they have been actuated into the air pockets.

Outward movement of the pistons is limited by use of stops 57 that may be fixed to the vehicle frame and against which the lever arms 10 may engage.

Assuming that the several air cylinders are so mounted on the vehicle frame, and are connected as described with the main supply and clearance tanks, and the pistons, are connected operatively with the axles as shown in Figure 2, the operation of the system will be as follows:

First air under pressure is admitted into the cylinders from the supply tank to fill the same and the tanks 17, and to move the pistons to their normal working positions, which will be the relative positions illustrated in Figure 3. When this position is reached, the valves 38 and 39 will both be closed, as the cam will then, as before stated, be in a neutral position. This position will then be maintained until there is a material change in the load. Now, then should added weight be placed within the vehicle which would depress the pistons within their cylinders, this will cause the arms 26 on the pistons to be moved inwardly along the twisted portions of bars 24, to rotate the bars and thereby actuate the cams 32 to open the valves 39 and allow high pressure air to enter the cylinders and tanks 17, from the tank 15. This inflow of air will counteract the added weight and will move the pistons outwardly to their normal position and cause the valves 39 to be closed when this normal position is reached.

Likewise, if the load in the vehicle be decreased below normal, a normal working pressure of air within the cylinders will force the pistons outwardly. This will cause the bars 24 to be rotated in such direction that the valves 38 will be opened and a discharge of air from the clearance tanks and cylinders permitted. Such discharge will continue until the pressure is sufficiently decreased that the pistons again will move to normal position. Thus it will be seen that the movement of the pistons automatically effect the exhaustion or charging of the cylinders in such manner that the riding level of the vehicle body is kept constant regardless of the load carried therein and the maximum resiliency and desirable riding qualities will in this manner be maintained.

By use of the clearance tanks it will be seen that practically full strokes of the pistons can be had without any appreciable change in pressure in the cylinders and due to this there will be very little jolt in riding over rough or uneven road surfaces.

It is apparent also that a desired variation of a more or less degree in the movement of the pistons on either side of a neutral position before effecting the valve mechanism could be provided by elongating the twisted sections of the bar 24, therefore, in this and other details of construction I do not wish to be limited, as variations could be easily made without departing from the spirit of the invention.

Having thus described my invention, what I claim as new therein and desire to secure by Letters Patent, is:

1. In a pneumatic suspension, a cylinder provided at one end with an inlet and an exhaust port, adjacent valves for controlling said ports and yieldable means for normally retaining said valves in closed position, a piston operable in said cylinder, a source of supply of compressed fluid connected with the cylinder through the inlet port, a cam mounted intermediate the valves rotatable in opposite directions to actuate said valves to open position and means connecting the cam operatively with the piston whereby outward movement of the latter, from a neutral position, will rotate the cam to effect the opening of the exhaust valve and inward movement from the neutral position will effect the opening of the inlet valve, in such manner as to maintain a predetermined volume of fluid within the cylinder.

2. The combination with a vehicle body frame and a supporting axle therefor, of a pneumatic suspension comprising an air cylinder having an inlet and an exhaust valve therein, a piston operatively mounted in said cylinder, means connecting the said cylinder and piston respectively with the said body and axle to support the body through said connections and upon the air that may be contained within the cylinder, a high pressure air supply tank having an air conduit connection with the cylinder through its inlet valve, a valve actuating rod revolubly supported within the wall of said cylinder having operative connection with the piston and adapted to be revolved in opposite directions by the movement of the latter in opposite directions from a normal position, a cam fixed on said rod adapted to engage and open the said exhaust valves when the piston moves outwardly and to engage and open the inlet valve when it moves inwardly from normal position, for the purpose set forth.

3. In a pneumatic suspension, a cylinder having an inwardly opening slot longitudinally thereof; said slot having communication with inlet and exhaust valves, yieldable means normally retaining the valves in closed position, a source of supply of compressed fluid connected with the cylinder through the inlet valve, a piston operable within the cylinder, a rotatable cam bar mounted to extend longitudinally of the slot, a cam fixed on said bar and adapted, upon rotation of the latter in opposite directions, to engage and actuate said valves to open position, an arm fixed to the piston and connected operatively with the cam bar to effect rotation of the latter in opposite directions upon movement of the piston in opposite directions from a predetermined position within the cylinder.

4. In a device of the class described, the combination with a cylinder having inlet and exhaust valves therein and a piston operable within the cylinder, of a valve actuating mechanism comprising a flat bar supported at its ends for rotation, said bar having means thereon for separately actuating the said valves upon rotation of the bar in opposite directions, and having a twisted portion between its ends, an arm fixed to the piston provided with a slot for receiving the bar, said arm being movable along the bar in opposite directions across the twisted portion for effecting rotation of the rod in opposite directions.

5. In a pneumatic suspension device, a cylinder having a closed end and having an inwardly opening slot extending longitudinally within the wall thereof and terminating at a point spaced from said closed end to provide an air pocket, an inlet and an exhaust valve communicating with the cylinder through said slot, a piston operable within the cylinder and movable into and from the said air pocket, a source of fluid pressure medium connected with the cylinder through the inlet valve and means operatively connected with the piston for actuating said valves to control the flow of the pressure medium into and from the cylinder.

6. In a pneumatic suspension device, a cylinder having a closed end and having an inwardly opening slot extending longitudinally within the wall thereof and terminating at a point spaced from said closed end to provide an air pocket, an inlet and an exhaust valve communicating with the cylinder through the slot, a hollow piston operable within the cylinder and movable at its inner end into and from the air pocket, a source of fluid pressure medium connected with the cylinder through the inlet valve, means operatively connected with the piston for actuating the said valves to control the flow of the pressure medium into and from the cylinder; said piston having ports in the wall thereof in continuous registration with the said slot and provided at its inner end with an outwardly opening valve for the admittance of air into the air pocket after the piston has been moved to its inner limit of travel.

7. The combination with a vehicle body frame and the supporting axles therefor of a pneumatic suspension comprising, air cylinders that are fixed to said frame, pistons operable within the cylinders and having connection with the axles in such manner that the body is supported through said connections and upon the air confined within the cylinders; each of said cylinders having an air exhaust and an inlet valve therein, a high pressure air storage tank having conduit connection with each of said cylinders through its inlet valve, clearance tanks of relatively large volume for each of said cylinders having direct air conduit connection therewith, and means operable by movement of the pistons for actuating the valve mechanism of their cylinders to permit an inflow of air into the cylinders from the storage tank, or from the cylinders and clearance tanks as is required to maintain the vehicle body at the same riding height under different loads.

Signed at Seattle, Washington this 19th day of July 1920.

HARRY OTIS LASSEN.